Nov. 29, 1938.　　　　J. W. MYERS　　　　2,138,706
ELECTRICAL COOKING APPARATUS
Filed June 18, 1936　　　　4 Sheets-Sheet 1

Inventor
Joseph W. Myers
by his Attorneys
Howson & Howson

Nov. 29, 1938.   J. W. MYERS   2,138,706
ELECTRICAL COOKING APPARATUS
Filed June 18, 1936   4 Sheets-Sheet 2
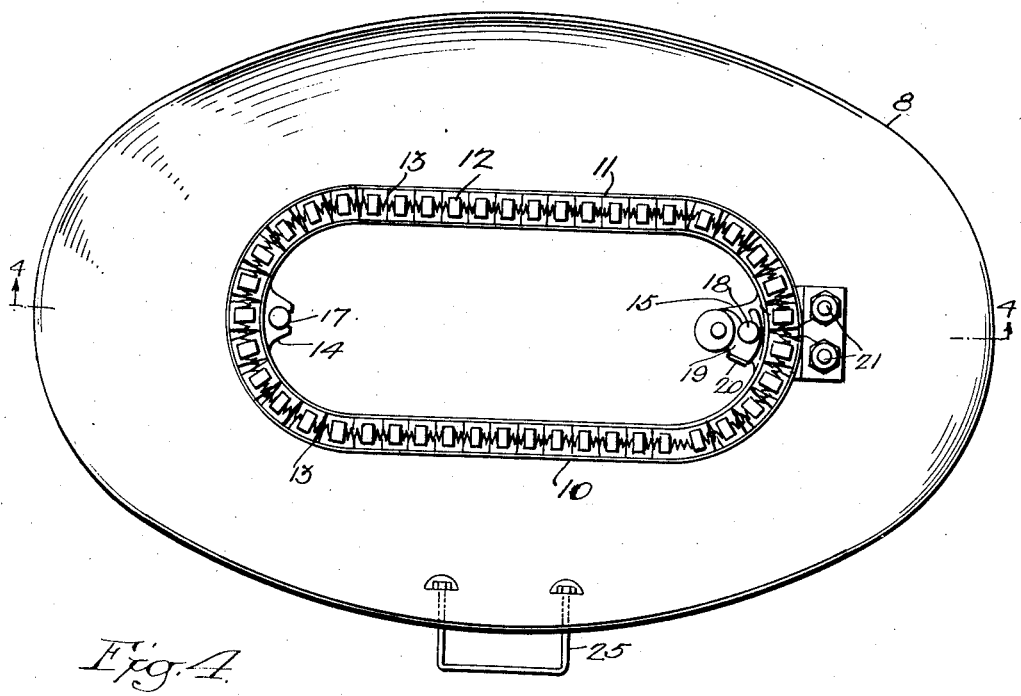
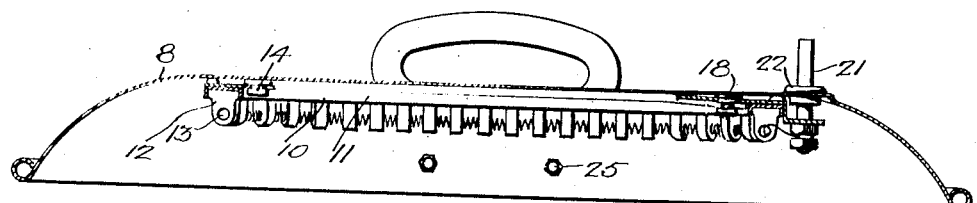
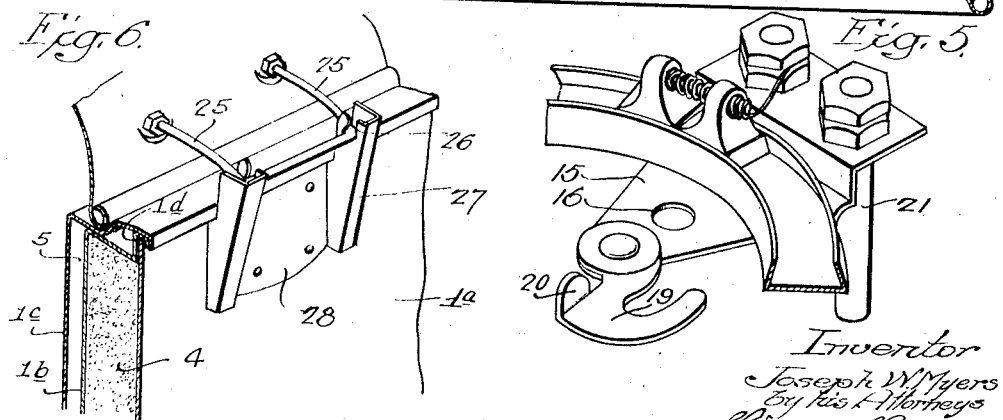
Inventor
Joseph W. Myers
by his Attorneys
Howson & Howson

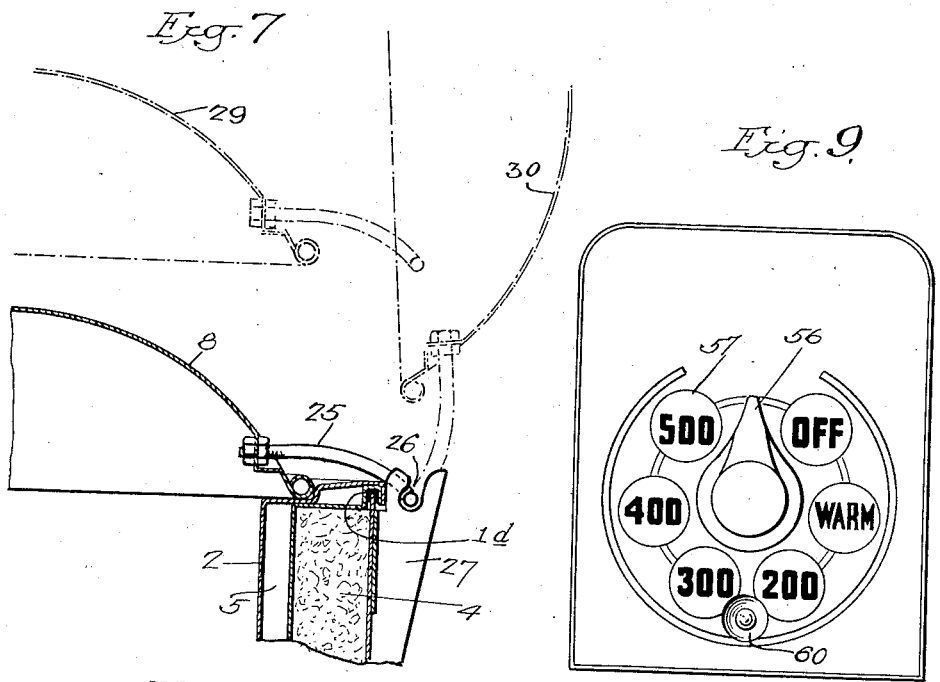
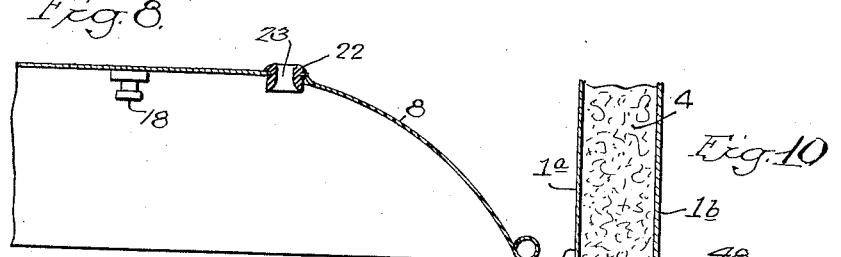
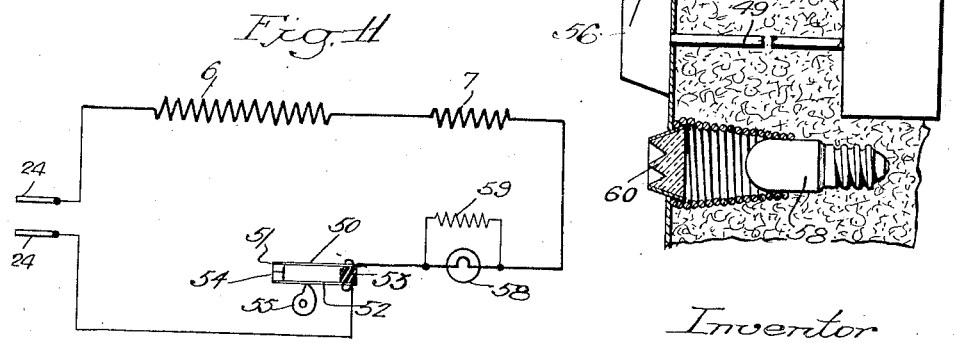

Nov. 29, 1938.   J. W. MYERS   2,138,706
ELECTRICAL COOKING APPARATUS
Filed June 18, 1936   4 Sheets-Sheet 4
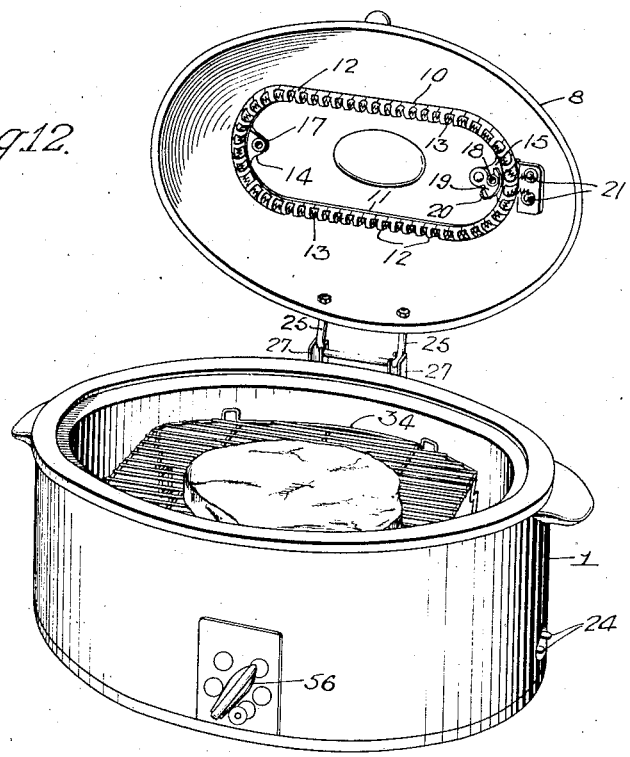
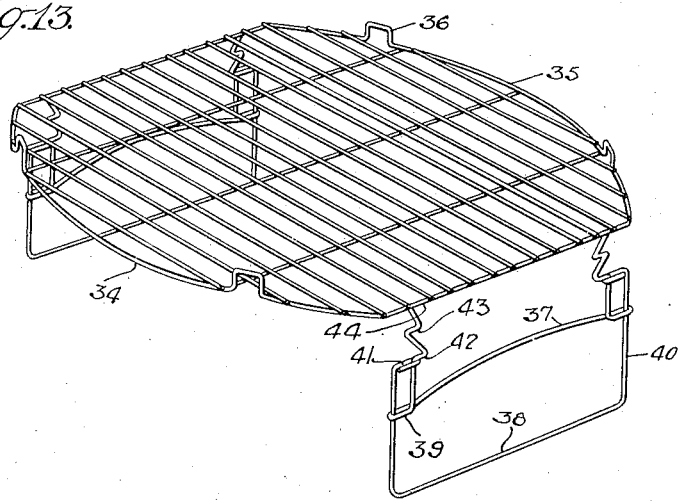
Inventor:-
Joseph W. Myers
by his Attorneys
Howson & Howson Patented Nov. 29, 1938

2,138,706

UNITED STATES PATENT OFFICE 2,138,706

ELECTRICAL COOKING APPARATUS

Joseph W. Myers, Philadelphia, Pa., assignor to Proctor & Schwartz, Inc., Philadelphia, Pa., a corporation of Pennsylvania Application June 18, 1936, Serial No. 85,994

7 Claims. (Cl. 219—35)

This invention relates to electrical cooking appliances and, more particularly, to a novel electrical cooking appliance embodying features which render the appliance extremely flexible in its capabilities of operation and make it readily possible to obtain results and to perform a variety of cooking operations which have heretofore been obtainable only by the use of several appliances or by the use of a cooking range of much greater capacity than the present device. More specifically, the invention provides an appliance which is adapted to operate from an electrical source of relatively low power output, such as a conventional household convenience outlet having a maximum electrical power output of 1650 watts, and yet is capable of performing a wide variety of cooking operations, in fact, practically any of the cooking operations normally employed.

The principal object of the invention, therefore, is to provide a novel electrical cooking appliance which is adapted to operate from an electrical source of relatively low power output and which is extremely flexible in operation and capable of performing a wide variety of functions.

Another object of the invention is to provide an electrical cooking appliance of this character comprising a relatively deep vessel having heating units designed and arranged in predetermined relation to one another and having heat-responsive means for controlling the heating units and indicating means for indicating the condition of the vessel, a relatively shallow cover or lid for the vessel having an auxiliary electrical heating unit of predetermined capacity mounted thereon in cooperation with the vessel, and means whereby the first-mentioned heating units and the last-mentioned heating unit may be energized separately and selectively only. The invention thus provides an appliance having a cooking chamber which is heatable to a desired temperature that is automatically maintained, and an auxiliary heating unit arranged cooperatively with the said chamber, the heating means of said chamber and said auxiliary unit being selectively operable, whereby the appliance may be variously operated as hereinafter described to perform various cooking operations in a highly efficient manner.

A further object of the invention is to provide other specific novel features in an appliance of this character which enhance and facilitate the operation of the appliance as set forth more fully hereinafter and defined in the appended claims.

In the accompanying drawings:

Fig. 3 is a face view of the inner side of the cover or lid of the appliance;

Fig. 4 is a sectional view of the cover or lid taken along line 4—4 of Fig. 3;

Fig. 5 is a fragmentary perspective view showing a portion of the removable heating unit structure carried by the cover;

Fig. 6 is a fragmentary perspective view illustrating the novel hinge structure of the appliance;

Fig. 7 is a detail sectional view illustrating further the hinge structure and the manner of utilization thereof;

Fig. 8 is an enlarged fragmentary sectional view showing a portion of the cover so as to illustrate a certain feature;

Fig. 9 is a face view of the control panel or wall of the device;

Fig. 10 is an enlarged fragmentary sectional view showing the arrangement of the thermostatic control and the indicating device of the appliance;

Fig. 11 is a schematic illustration of the electrical circuit of the device;

Fig. 12 is a perspective view of the device illustrating its adaptability for broiling and like operations; and Fig. 13 is a perspective view of the adjustable rack or support employed.

Figure 1:
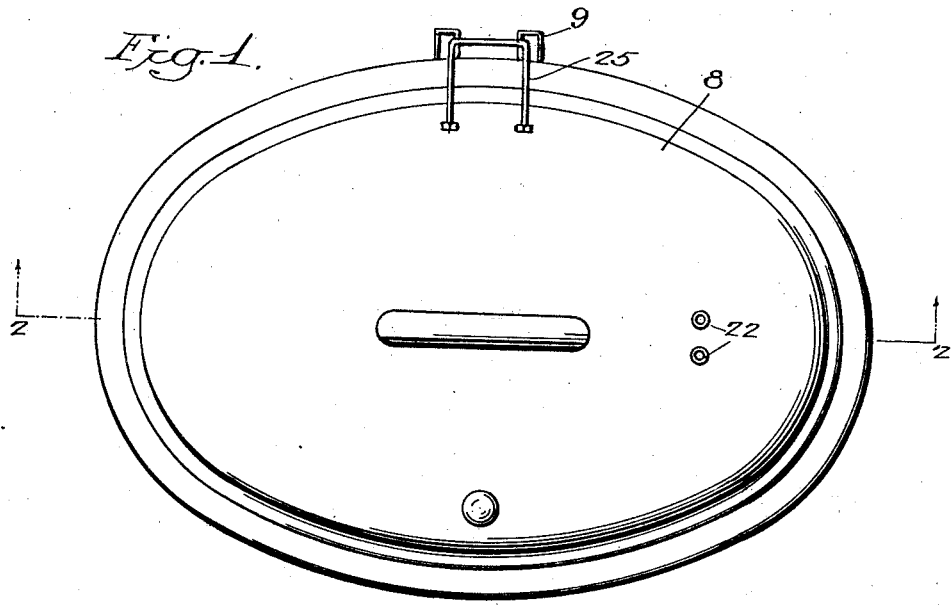
Fig. 1 is a plan view of a preferred form of the appliance.
Figure 2:
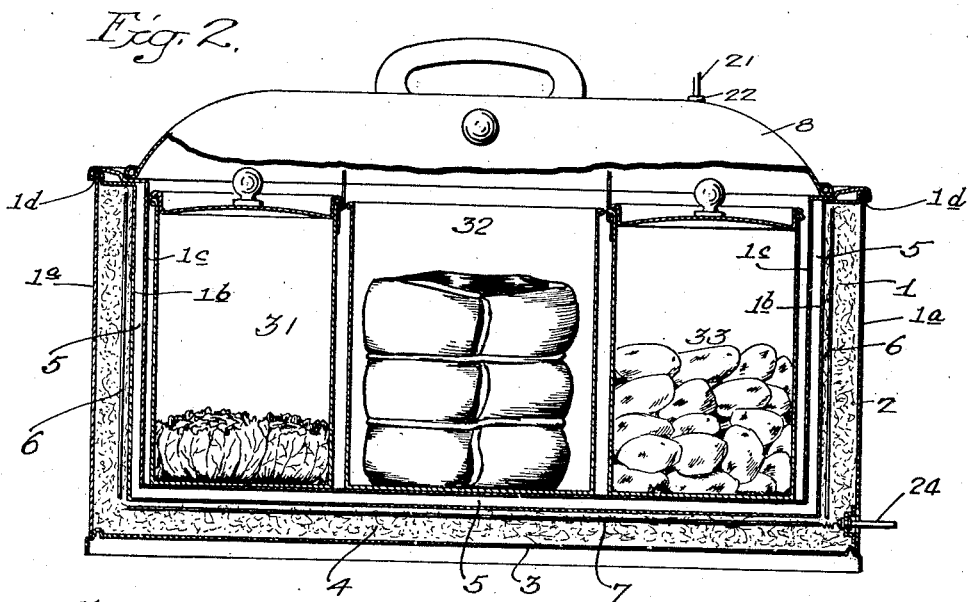
Fig. 2 is a sectional view taken along line 2—2 of Fig. 1 showing cooking receptacles arranged within the appliance.

Referring now to Figs. 1 and 2 of the drawings, the appliance comprises a relatively deep vessel 1 which is preferably oval in shape, although it will be understood that the vessel may take any desired form. The vessel may comprise nested receptacles 1a, 1b and 1c to provide a hollow side wall 2 and bottom 3 within which suitable heat-insulating material 4 of any conventional form may be disposed, and to provide a dead air space 5 between receptacles 1b and 1c, which serves to distribute the heat from the heating units uniformly about the interior space of the vessel. An electrical heating unit 6 is disposed within the side wall adjacent receptacle 1b and surrounds the interior space of the vessel, while a second electrical heating unit 7 is disposed within the bottom of the vessel adjacent receptacle 1b and extends substantially throughout the area of the bottom. These heating units may take any suitable form and may, for example, comprise units of the general type employed in appliances of this general nature. The heating units are designed, however, so that their total electrical power consumption is less than the maximum power output of the conventional household convenience outlet. As stated above, such outlets generally having a maximum power output of 1650 watts, and the units 6 and 7 are preferably designed so as to have a total power consumption of 1320 watts. The heating units are also designed in predetermined relation to one another such that the side heating unit 6 supplies a major part of the total heat, while the bottom heating unit 7 supplies only a relatively minor part of the heat. Preferably, the heating units are so designed that the side unit 6 supplies about 85% of the total heat, while the bottom unit 7 supplies only about 15% of the heat. The reason for this specific design of the heating units will be discussed in detail later.

Figure 2A:
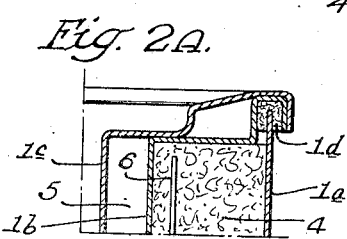
Fig. 2A is a fragmentary sectional view illustrating a certain feature of the appliance.

As shown more clearly in Fig. 2A, the upper peripheral edge of receptacle 1b is bent over the upper peripheral edge of receptacle 1a, and heat-insulating strip 1d is interposed between the said edges. This strip, which may be formed of any suitable material, serves to prevent transfer of heat by conduction from the receptacles 1b and 1c to the receptacle 1a, thus increasing the efficiency of the device and enhancing its operation. The peripheral portion of vessel 1c is sloped downward toward the interior of the vessel to carry material deposited thereon by condensation back to the interior of the vessel.

The appliance also comprises a relatively shallow lid or cover 8 which is adapted to be removed entirely from the vessel 1 or may be hingedly operated in respect to the vessel by virtue of the novel hinge structure 9 described more fully hereinafter. The cover defines a space above the vessel 1. The inner surface of the cover 8 is heat-reflecting and carries a removable heating unit structure 10 within the said space in cooperative relation with said surface and said vessel. The heat-reflecting surface serves to direct and concentrate the heat from unit 10 onto articles being cooked thereby, as described hereinafter. As shown more clearly in Figs. 3 and 4, the structure 10 preferably comprises an ovate support 11 carrying insulating blocks 12 which serve to support an electrical heating unit 13. As illustrated, the support 11 preferably takes the form of a channel member having the insulating blocks 12 seated therein. At one end, the support 11 carries a recessed lug 14 and at its other end, the support carries a bracket 15 (see Fig. 5) having an aperture 16 therein. The recessed lug 14 and the aperture 16 are adapted to receive projecting knobs 17 and 18, respectively, carried upon the inner side of the cover 8. The knob 17 is provided with a peripheral recess so that the recessed lug 14 may be brought into cooperative relation therewith by moving the support 11 longitudinally, and the knob 18 is likewise provided with a peripheral recess adapted to receive the hook-like latch 19 (see Fig. 5) which is pivotally carried upon bracket 15. The latch 19 is provided with a finger piece 20 to facilitate operation thereof. It will be seen that the structure 10 may be readily mounted upon and removed from the inner side of the cover 8.

The bracket 15 also carries terminal posts or prongs 21 to which the ends of the heating unit 13 are electrically connected. These terminal prongs are adapted for insertion through insulated bushings 22 permanently carried within openings 23 in the cover, as shown clearly in Fig. 8. In addition to removably receiving the terminal prongs 21, these openings serve an additional function which will be discussed hereinafter.

The heating units 6 and 7 described above are preferably connected in series relation with one another and are electrically connected to terminal prongs 24 extending from the side wall of vessel 1 near the bottom thereof, as shown clearly in Fig. 2. In accordance with the invention, the heating units 6 and 7 and the heating unit 13 are adapted for separate and selective operation only. The reason for this will be discussed in detail later. To this end, the prongs 21 and the prongs 24 are of a special character so that they will receive only a special attachment plug specifically adapted for use with them. Preferably, the two sets of prongs have a certain spacing such that the conventional cord and plug cannot be employed with them but they require a special cord and plug to be supplied with the appliance. This special plug will be connected to the end of a conductor cord, as commonly employed in the use of household appliances, and the other end of the cord will carry a conventional plug adapted to be inserted in the usual convenience outlet. It will be seen, therefore, that, by using a single supply cord of this nature, the heating units 6 and 7 and the heating unit 13 may only be energized separately and selectively. The heating unit 13, like the units 6 and 7, is designed to have a maximum power consumption less than the maximum power output of the conventional household convenience outlet. Preferably, the unit 13 has a maximum electrical power consumption of about 1500 watts. Thus, the units 6 and 7, or the unit 13, may be electrically connected to a low capacity electrical source, such as the usual convenience outlet, without exceeding the power output of such source.

The hinge structure 9 and the manner of operation thereof are clearly illustrated in Figs. 6 and 7. This structure comprises a U-shaped member 25 carried by the cover 8 and adapted to seat in recesses 26 of the supports 27 forming a part of bracket 28 which is carried by the side wall of the vessel 1. The recesses 26 are formed as illustrated so that the lid 8, when in place upon the vessel 1, may be lifted vertically upward off of the vessel 1, as shown in broken-line representation in Fig. 7 at 29, and during such removal, the U-shaped member 25 is freely removable from the recesses 26; or the cover 8 may be hingedly operated in respect to the vessel 1, as illustrated in broken-line representation in Fig. 7 at 30, in which case, the recesses 26 retain the member 25 so that the hinge structure operates as an ordinary hinge. This structure greatly facilitates the use and operation of the appliance.

The vessel 1 is adapted to receive either the cooking receptacles 31, 32 and 33, as illustrated in Fig. 2, or the rack 34 (see Figs. 12 and 13), as will be discussed hereinafter. The receptacles 31, 32 and 33 may be constructed and arranged in accordance with the teaching of United States Patent 2,078,165, granted to Walter M. Schwartz on April 20, 1937, so that these receptacles may be handled individually or together as a unit. It will be understood, however, that ordinary cooking receptacles may be employed. The rack 34 comprises an open or mesh-like body 35 having integral feet 36 extending from one side thereof and having members 37 extending from the other side which are adapted for adjustable attachment to supports 38. To this end, the members 37 are formed to provide retainer portions 39 which are adapted to slidably retain the side members 40 of the supports 38, and the upper ends of the side members 40 are bent as illustrated at 41 for cooperative engagement with the portions 42, 43, and 44. In Fig. 13, the body or rack 35 is supported in its highest position, the portions 41 of supports 38 engaging the lowermost latching portions 42 of members 37. It will be seen, however, that by springing the sides 40 inward, the portions 41 may be made to seat in the latching portions 43 or the latching portions 44, at which time, the retainer portions 39 of members 37 will slide downwardly upon the sides 40 of supports 38. While three position adjustments of the rack 35 upon the supports 38 are embodied in the illustrated form of the device, it will be apparent that further position adjustments may be readily provided by proper construction of the cooperating members.

The vessel 1 is provided with means for accurately controlling the heating units 6 and 7 so as to automatically obtain and maintain a predetermined temperature within the vessel, and there is further provided means for indicating the condition of the heating units and the temperature inside vessel 1. Moreover, there is provided means whereby the predetermined temperature of vessel 1 may be adjusted to perform various cooking operations and whereby the heating units 6 and 7 may be manually deenergized to interrupt the cooking operation. There is mounted within the side wall of vessel 1 at the front and near the bottom thereof, a thermostatically-controlled switching device 48, as shown in Fig. 10, and this device is controllable by means of the rotatable shaft 49. As illustrated in Fig. 11, the thermostatic switch 48 is connected in series relation with the heating units 6 and 7 and is adapted to control the energizing circuit for the said units. The device 48 comprises essentially a thermostatic element 50 which may take the form of a bimetallic strip and which carries a contact 51, and a flexible contact arm 52 mounted cooperatively with the element 50 upon a common insulating support 53 and carrying a contact 54 cooperatively associated with contact 51. The device further comprises a cam 55 carried upon the control shaft 49 and cooperatively arranged with arm 52 so as to control the position of that arm. In operation, the thermostatic strip 50 flexes outwardly in response to heat and causes the contacts 51 and 54 to open at a predetermined temperature. This temperature may be varied by adjusting the position of arm 52 causing this arm to exert at contact 54 more or less pressure upon contact 51 to vary the flexing movement of strip 50 necessary to open the contacts. When the cam 55 is moved to its lowermost position, however, the contacts 51 and 54 are opened by virtue of the resilience of arm 52 which causes that arm to move away from strip 50. The control shaft 49 of the device carries at its outer end a knob (see Fig. 9) which serves cooperatively with indicia 57 on an indicating panel of vessel 1, thus enabling adjustment of the device 48 for operation at any one of the various temperatures indicated or to deenergize the heating units as also indicated.

As illustrated in Fig. 10, there is also provided on vessel 1, an indicator in the form of a pilot light 58, which is preferably mounted below the control shaft 49 so as to be clearly visible on the control panel as shown in Fig. 9. As illustrated in Fig. 11, the indicating lamp 58 is shunted by a resistance 59 and the two are connected in series relation with the heating units 6 and 7 and with the thermostatic switch 48, so that the indicating light is energized when the circuit of the heating units is closed and is deenergized when the said circuit is opened. Thus, it will be seen that when the appliance is turned on, the light indicates the fact that the vessel 1 is being heated and when the indicating light is extinguished or goes out, the user is apprised of the fact that the temperature for which the thermostatic switch has been set has been reached. Until such time as the thermostatic device is readjusted or the appliance is turned off, the thermostatic switch will maintain the vessel 1c at the desired temperature. There is preferably associated with lamp 58, a glow cone 60 of the type disclosed and claimed in Patent No. 2,006,509, granted July 2, 1935.

As previously mentioned, the appliance is adapted by virtue of its structural features above described for wide flexibility of operation and for the performance of various cooking operations. It is possible by the use of the receptacles 31, 32 and 33 to cook efficiently a number of articles at one time, employing the heating units 6, 7 and 13 in cooperative manner, as explained more fully later. For example, meat may be roasted in the inner receptacle, while vegetables are being cooked at the same time in the outer receptacles, as indicated in Fig. 2. The specific arrangement and design of the heating units 6 and 7 and the heat distribution obtained, enables the thorough cooking of articles such as meats without burning the meat juices which naturally fall to the bottom of the vessel. Alternatively, by employing the adjustable rack 34, as illustrated in Fig. 12, articles such as steaks and chops, or dishes such as au gratin potatoes, may be properly cooked employing the heating units in cooperative manner, as explained below, the rack being adjusted to the proper height for the particular broiling or browning operation to be performed. The rack may also be inverted so that it stands on feet 36 and when thus positioned within the vessel 1, the rack serves as a trivet for a large roast or it may serve as a support for pie or cake pans, thus enabling the baking of pies, cakes and the like. During such use of the rack, the supports 38 may be used as handles, thus enabling easy handling of the rack. In any case, the heating units 6, 7 and 13 are usable cooperatively to definite advantage during various cooking operations, as will now be explained.

One very serious objection to electric roasters of the type adapted to employ several cooking receptacles to enable the cooking of vegetables at the same time that meat is being cooked, has been that the water vapors from the vegetables and the heat lost thereby tend to keep the meat from browning as preferred by most people. By means of the present appliance, however, the several articles may be cooked in the vessel 1 by means of heating units 6 and 7 and when the vegetables are cooked, the vegetable containers may be removed and the plug may be removed from the prongs 24 and connected to the prongs 21, thereby deenergizing the heating units 6 and 7 and energizing the unit 13. By thus using the unit 13 to complete the cooking of the meat, the desired browning of the meat may be quickly obtained without evaporation of the juices which would occur if the meat were browned by the heating units 6 and 7. This same procedure may be employed in cooking au gratin dishes and the like, so that the articles are cooked principally by the heating units 6 and 7 and the final browning operation is obtained by the use of the unit 13. If desired, the procedure may be reversed, using the unit 13 first to broil or sear the article to be cooked and then using the units 6 and 7 to complete the cooking operation.

The appliance has a further definite advantageous function in that the thermostatically controlled heating units 6 and 7 may be employed to preheat the vessel 1 prior to the broiling of articles by means of the unit 13. It is a common objectionable feature of broilers of comparatively low energy density compared with the area covered, which is a necessary characteristic of broiler appliances operated from the usual convenience outlet, that satisfactory cooking of some meats and other articles cannot be obtained. The present invention overcomes this objection by enabling the preheating of the vessel 1 prior to the broiling of such articles. Thus, the units 6 and 7 may be energized to heat the vessel 1 to a desired predetermined temperature, and when the pilot light indicates that the desired preheating of vessel 1 has been completed, the article to be cooked may be placed in the vessel upon the rack 34 and the plug may be transferred to the unit 13 to perform the broiling operation.

It will be seen, therefore, that the invention provides a cooking chamber which is heatable to a desired temperature that is automatically maintained, and an auxiliary heating unit arranged cooperatively with said chamber, so that the auxiliary heating unit may be used to initiate or complete cooking operations performed by the heating means of said chamber, or the auxiliary unit may be used to perform other cooking operations following the preheating of said chamber by the automatically controlled heating means thereof.

From the above, it will be seen that the heating units 6, 7 and 13 are cooperatively associated so that they may be used in various manners in the cooking operations to obtain highly satisfactory results. Moreover, it will be apparent that the appliance is adapted to perform practically any cooking operation in a highly satisfactory manner.

The removability of the unit 10 enables the thorough cleaning of that unit and the inner surface of the reflecting cover 8 and, furthermore, the openings 23 may serve the purpose of vents when it is desired to use the heating units 6 and 7 only. In other words, the unit 10 may be removed and foods may be cooked in the vessel 1c and, during such cooking operations, the openings 23 will serve as vent openings to permit the escape of steam or vapors when desired. It will be noted also that the unit 10 is readily removable without the use of tools or separate fastening devices.

Although the invention has been described with reference to a specific preferred embodiment, it will be understood that various changes and modifications may be made without departing from the principles of the invention.

I claim:

1. In an electrical cooking appliance, a vessel comprising a plurality of nested receptacles, two of said receptacles having their upper peripheral edges thermally isolated one from another by a heat-insulating strip interposed between said edges, and a third one of said receptacles being disposed within the other two and spaced therefrom to provide heat-circulating space about the interior of the vessel, heat-insulating means between said two receptacles, electrical heating units of predetermined relative capacity disposed between said two receptacles adjacent the innermost one at the side and bottom of the vessel, the relative capacities of said units being such that a major portion of the total heat therefrom emanates from the side wall of the vessel, an electrical circuit including said units, heat-responsive means on said vessel for controlling said circuit and operative to maintain the interior of the vessel substantially at a predetermined temperature, and indicating means on said vessel operative to apprise the user of the condition of said circuit and whether said predetermined temperature has been reached.

2. A combined roaster and broiler appliance for household use, comprising a relatively deep vessel, an electrical roaster unit including electrical heating elements disposed within the side walls and bottom of said vessel, said unit being constructed and arranged to have a normal energy consumption approaching a given permissible energy consumption for the entire appliance, an electrical circuit including said unit, electrical terminal connectors for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a hinged lid or cover for said vessel, an electrical broiler unit mounted on the inner side of said cover, said broiler unit being constructed and arranged to have a normal energy consumption approaching said permissible consumption for the entire appliance, the total energy consumption of both of the said units being greatly in excess of said permissible consumption, and electrical terminal connectors for said broiler unit on said cover, the terminal connectors on said vessel and the terminal connectors on said cover being constructed and arranged to be incapable of receiving the usual household appliance connectors but capable of receiving selectively a single electrical connector supplied with the said appliance, whereby the said units may be energized separately and selectively only.

3. A combined roaster and broiler appliance for household use, comprising a relatively deep vessel, an electrical roaster unit including electrical heating elements disposed within the side walls and bottom of said vessel, said unit being constructed and arranged to have a normal energy consumption approaching a given permissible energy consumption for the entire appliance, an electrical circuit including said unit, electrical terminal prongs for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a hinged concavo-convex lid or cover for said vessel having a heat-reflecting inner concave surface, an electrical broiler unit mounted on the inner side of said cover adjacent said reflecting surface so that the said surface reflects the heat from said broiler unit into said vessel, said broiler unit being constructed and arranged to have a normal energy consumption approaching said permissible consumption for the entire appliance, the total energy consumption of both of the said units being greatly in excess of said permissible consumption, and electrical terminal prongs for said broiler unit on said cover, the terminal prongs on said vessel and the terminal prongs on said cover having a greater spacing than those of the usual household appliance connectors so as to be capable of receiving only and selectively an electrical connector supplied with the said appliance.

4. A combined roaster and broiler appliance for household use, comprising a relatively deep vessel, an electrical roaster unit including electrical heating elements disposed within the side walls and bottom of said vessel, said unit being constructed and arranged to have a normal energy consumption approaching a given permissible energy consumption for the entire appliance, an electrical circuit including said unit, electrical terminal prongs for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a hinged lid or cover for said vessel, an electrical broiler unit removably mounted on the inner side of said cover and having electrical terminal prongs extending removably through openings in the cover to permit removal of the entire broiler unit from the cover, said broiler unit being constructed and arranged to have a normal energy consumption approaching said permissible consumption for the entire appliance, the total energy consumption of both of the said units being greatly in excess of said permissible consumption, the terminal prongs on said vessel and the terminal prongs on said cover having a greater spacing than those of the usual household appliance connectors so as to be capable of receiving only and selectively an electrical connector supplied with the said appliance.

5. A combined roaster and broiler appliance for household use, comprising a relatively deep vessel, an electrical roaster unit including electrical heating elements disposed within the side walls and bottom of said vessel, said unit being constructed and arranged to have a normal energy consumption approaching a given permissible energy consumption for the entire appliance, an electrical circuit including said unit, electrical terminal prongs for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a hinged lid or cover for said vessel, an exposed electrical broiler unit of closed loop form removably mounted on the inner side of said cover and having electrical terminal prongs extending removably through openings in the cover to permit removal of the entire broiler unit from the cover, said broiler unit being constructed and arranged to have a normal energy consumption approaching said permissible consumption for the entire appliance, the total energy consumption of both of the said units being greatly in excess of said permissible consumption, the terminal prongs on said vessel and the terminal prongs on said cover having a greater spacing than those of the usual household appliance connectors so as to be capable of receiving only and selectively an electrical connector supplied with the said appliance.

6. A combined roaster and broiler appliance for household use, comprising a relatively deep vessel, an electrical roaster unit including electrical heating elements disposed within the side walls and bottom of said vessel, said unit being constructed and arranged to have a normal energy consumption approaching a given permissible energy consumption for the entire appliance, an electrical circuit including said unit, electrical terminal prongs for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a lid or cover removably and hingedly mounted on said vessel whereby the cover may be removed from the vessel at will, an electrical broiler unit mounted on the inner side of said cover, said broiler unit being constructed and arranged to have a normal energy consumption approaching said permissible consumption for the entire appliance, the total energy consumption of both of the said units being greatly in excess of said permissible consumption, and electrical terminal prongs for said broiler unit on said cover, the terminal prongs on said vessel and the terminal prongs on said cover having a greater spacing than those of the usual household appliance connectors so as to be capable of receiving only and selectively an electrical connector supplied with the said appliance.

7. A combined roaster and broiler appliance for household use, comprising a cooking vessel, an electrical roaster unit disposed within the walls of said vessel, said unit being constructed and arranged to have a normal energy consumption approaching a given permissible energy consumption for the entire appliance, an electrical circuit including said unit, electrical terminal connectors for said circuit on said vessel, heat-responsive means on said vessel for controlling said circuit and operative to maintain the interior of the vessel substantially at a predetermined temperature, indicating means on said vessel operative to apprise the user of the condition of said circuit and whether said predetermined temperature has been reached, a lid or cover for said vessel having a heat-reflecting inner surface, an electrical broiler unit, means for mounting said broiler unit hingedly with respect to said vessel in cooperative relation with said surface, so that said surface reflects the heat from said broiler unit into said vessel, said broiler unit being constructed and arranged to have a normal energy consumption approaching said permissible consumption for the entire appliance, the total energy consumption of both of the said units being greatly in excess of said permissible consumption, and electrical terminal connectors for said broiler unit, the terminal connectors for said roaster unit and the terminal connectors for said broiler unit being constructed and arranged to be incapable of receiving the usual household appliance connectors but capable of receiving selectively a single electrical connector supplied with the said appliance, whereby the said units may be energized separately and selectively only.

JOSEPH W. MYERS.